US007751643B2

(12) United States Patent
Zavadsky et al.

(10) Patent No.: US 7,751,643 B2
(45) Date of Patent: Jul. 6, 2010

(54) METHOD AND APPARATUS FOR REMOVING UNEVEN BRIGHTNESS IN AN IMAGE

(75) Inventors: Vyacheslav L. Zavadsky, Ottawa (CA); Jason Abt, Kanata (CA)

(73) Assignee: Semiconductor Insights Inc. (CA)

( * ) Notice: Subject to any disclaimer, the term of this patent is extended or adjusted under 35 U.S.C. 154(b) by 987 days.

(21) Appl. No.: 10/916,615

(22) Filed: Aug. 12, 2004

(65) Prior Publication Data

US 2006/0034540 A1  Feb. 16, 2006

(51) Int. Cl.
  *G06K 9/40* (2006.01)
(52) U.S. Cl. .................. 382/274; 382/254; 382/270; 382/273; 382/275
(58) Field of Classification Search ......... 382/141–146, 382/168–169, 274; 358/461
  See application file for complete search history.

(56) References Cited

U.S. PATENT DOCUMENTS

| | | | | |
|---|---|---|---|---|
| 5,345,313 A * | 9/1994 | Blank | | 348/598 |
| 5,563,962 A | 10/1996 | Peters et al. | | |
| 5,715,334 A | 2/1998 | Peters | | |
| 6,587,581 B1 | 7/2003 | Matsuyama et al. | | |
| 6,996,270 B1 * | 2/2006 | Ito | | 382/167 |
| 7,221,476 B2 * | 5/2007 | Nishi et al. | | 358/1.9 |
| 7,230,471 B2 * | 6/2007 | Choi et al. | | 327/536 |
| 2002/0090126 A1 | 7/2002 | Oosawa | | |
| 2002/0140693 A1 | 10/2002 | Nakami et al. | | |
| 2003/0012449 A1 * | 1/2003 | Usikov | | 382/274 |
| 2004/0105032 A1 * | 6/2004 | Kim et al. | | 348/607 |
| 2005/0088695 A1 * | 4/2005 | Fuchigami | | 358/2.1 |

* cited by examiner

*Primary Examiner*—Matthew C Bella
*Assistant Examiner*—Eric Rush
(74) *Attorney, Agent, or Firm*—Price, Heneveld, Cooper, DeWitt & Litton, LLP

(57) ABSTRACT

The present invention provides a method and apparatus for reducing uneven brightness in an image from a particle based image system. This uneven brightness is most often seen as regions of shadow, but may also be seen as regions of over brightness. In cases where the uneven brightness is in the form of shadowing, the method corrects for the shadowy regions by first identifying the area of shadow, obtaining brightness information from a region near the shadow, where the brightness is optimal, applying statistical methods to determine the measured brightness as a regression function of the optimal brightness, and number and proximity of shadowy objects, then correcting the shadow area brightness by calculating the inverse of the function of the shadow brightness. With this method, the brightness within the shadowy or over brightness regions are corrected to appear at a substantially similar level of brightness as the region of optimal brightness in the image.

22 Claims, 5 Drawing Sheets

METHOD AND APPARATUS FOR REMOVING UNEVEN BRIGHTNESS IN AN IMAGE

BACKGROUND OF THE INVENTION

1. Field of the Invention

The present invention relates generally to a method and apparatus for improving the quality of an image, and more particularly to removing uneven brightness in an image from a particle based image system.

2. Related Art

A potential problem with imaging using scanning electron microscopy (SEM), transmission electron microscopy (TEM) and other particle illumination based imaging systems, is the difference in brightness visible in regions of a surface of some materials. While this brightness difference may provide useful information by denoting the boundaries of uneven surfaces or structures, there are applications in which this uneven brightness can be problematic. These problematic regions may also include regions in which the brightness level is too high, making boundaries and other structures difficult to identify.

In an electron microscope or FIB, charged particles are accelerated and focused in a beam at a sample to be inspected. The interactions of the particles with the sample create a number of different emissions such as forward-scattered (transmitted) electrons, back-scattered electrons, secondary electrons, Auger electrons and X-rays. The brightness level in most images created from the detection of these emissions is related to the quantity of detected emissions.

Brightness artifacts occur when detection of emissions is affected by interference from nearby interior or surface structures of the sample.

In an SEM image of an integrated circuit, the brightness difference can generally be seen as shadowing and is most noticeable around interconnects and the edges of metal structures where surfaces are uneven. It is particularly noticeable in banks of interconnects. This shadowing makes automatic segmentation and manual study of the images difficult.

Some prior art methods include techniques for correcting contrast by comparing two images of the target object and correcting the target of interest based on the differential information.

U.S. Pat. No. 6,587,581, issued to Matsuyama et al on Jul. 1, 2003, discloses a method of correcting the difference in brightness between comparison images taken of a target area of interest, and a reference area having a corresponding pattern. This method has the disadvantage of requiring a reference area elsewhere in the image with a repeating pattern. In images in which there are no repeating patterns, this method would not be effective.

U.S. Pat. No. 5,715,334, which issued to Peters on Feb. 3, 1998, discloses a method to "smooth" contrast for detail enhancement of an image. Two smoothed images of the same target, each processed with a different smoothing factor, are compared to obtain differential information between least smoothed and most smoothed data sets. This method has the disadvantage of requiring multiple smoothing techniques and methods of comparing the two different images. Further, smoothing techniques tend to blur the image.

Other well-known brightness correction methods include techniques using histogram stretching or hysteresis filtering. These methods however, generally apply to brightness correction across an entire image and not to regions within an image.

Therefore, there is a need for a simpler technique for correcting the uneven brightness effects in an image.

SUMMARY OF THE INVENTION

The present invention is directed to a method and apparatus for correcting uneven brightness in an image. In accordance with the present invention, the correction may be achieved by identifying a first structure on the image having a region with uneven brightness, identifying a region of optimal brightness on the image near the region of uneven brightness and defining parameter information. A regression function of the optimal brightness region is fitted with the defined parameter information and the inverse of the regression function is calculated and applied to the region of uneven brightness to effect the correction.

In accordance with another aspect of this invention, the correction may be achieved by identifying a first structure on the image having a region with uneven brightness, identifying a region of optimal brightness on the image near the region of uneven brightness and correcting the region of uneven brightness as a function of the region of optimal brightness.

In accordance with a further aspect of this invention, the correction may be achieved by identifying a first structure on the image having a region with uneven brightness, identifying a region of optimal brightness on the image near the region of uneven brightness and determining the optimal brightness from the equation:

$$B_{measured}(x, y) = B_{optimal}(x, y) - \sum_{j \in All objects} f(\rho([x, y], Object_j)) + \xi(x, y),$$

where $B_{measured}$ is the observed brightness of an area of interest in the image, $B_{optimal}$ is a region [x,y] of the metal near the shadow, where the brightness is optimal $\rho([x, y], Object_j)$ is the shortest distance between point [x,y] and the object boundary; $\xi$ is the unknown point wise noise with zero mean; and $f$ is an unknown function that is estimated, whereby the region of uneven brightness is corrected using the equation:

$$B_{corrected}(x, y) = B_{measured}(x, y) + \sum_{j \in All objects} f(\rho([x, y], Object_j))$$

In accordance with another aspect of the invention, the method may be repeated to correct all subsequently identified regions with uneven brightness on the image. Further, the regions with uneven brightness may include regions having a shadowy effect and/or regions having over-brightness to be corrected.

In accordance with a specific aspect of this invention, the image may be a SEM image, a TEM image, or an image generated by FIB.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF THE INVENTION

For purposes of explanation, specific embodiments are set forth to provide a thorough understanding of the present invention. However, it will be understood by one skilled in the art, from reading this disclosure, that the invention may be practiced without these specific details. Moreover, well-known elements, devices, process steps and the like, are not set forth in detail in order to avoid obscuring the scope of the invention described.

Figure 1:
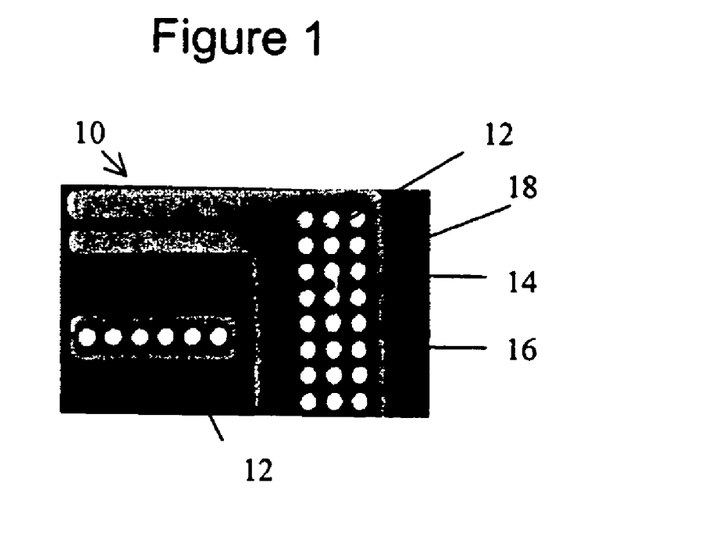
FIG. 1 is an SEM image of a partial delayered IC showing banks of interconnects showing uneven brightness.

FIG. 1 is a SEM image of a portion of an integrated circuit (IC) 10 showing two different interconnect banks 12, where shadowing 14 is visible in the vicinity of interconnects 16 and metal edges 18.

Figure 2:
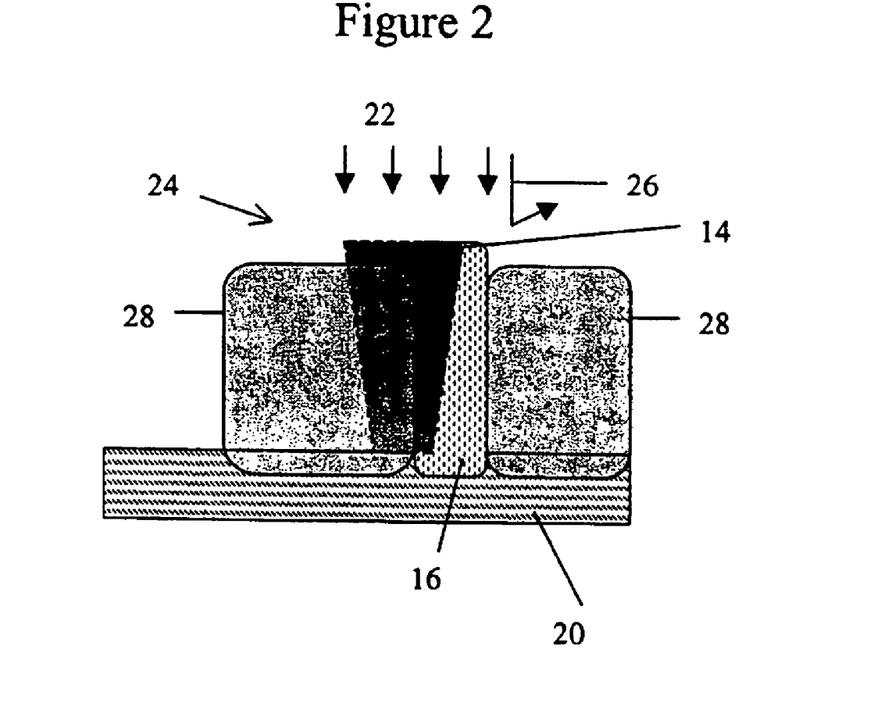
FIG. 2 is a schematic cut-away view of an interconnect and a single metal layer.

FIG. 2 is a simplified illustration of the physical principles that cause uneven brightness or a shadowing effect in the region of an interconnect 16 and a metal layer 20 in a SEM image. A scanning electron beam 22 is passed over the surface of a target 24 to be imaged. When the electron beam 22 hits the surface of the target 24, electrons are emitted in different directions represented by arrows 26. These emitted electrons 26 are detected by an electron detector (not shown). Some of the emitted electrons 26 may be blocked from the view of the electron detector. It is also possible that certain materials used for the interconnect, absorb the electrons at a higher rate. The fewer the number of emitted electrons 26 that the detector detects, the lower the brightness of the image in that area. Therefore, the brightness of the region where the electrons 26 are blocked by an adjacent structure, or contain a highly absorbent material, will be different. This difference in brightness may be seen as shadowing 14 on materials 28 surrounding the interconnect 16 or at the metal edges 18.

Figure 3:
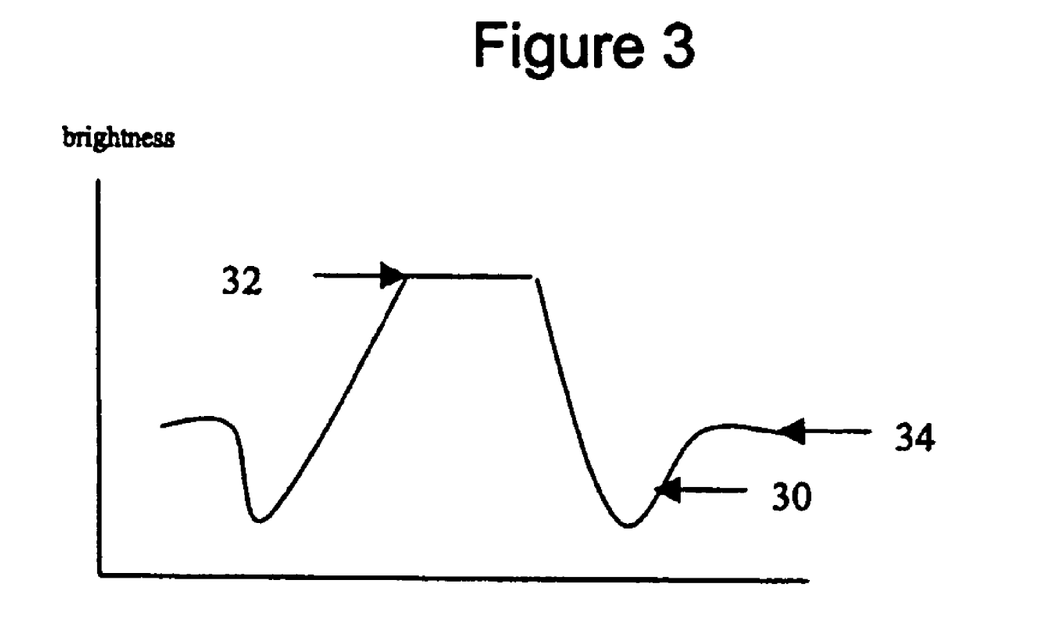
FIG. 3 is a graphical representation of the brightness levels across the entire area of an interconnect.

With reference to FIG. 3, the graph represents the brightness level occurring in a single interconnect 16 with shadowing. The point of least brightness 30, corresponds to the area of shadow, and the point of maximum brightness 32 corresponds to the high brightness level of the interconnect 16. The steady brightness region 34 adjacent the shadow region 30 represents the metal structure 20 surrounding the interconnect 16 where the brightness is optimal. The shadowing effect occurs in the region 30 where the brightness level dips below the optimal brightness level 34. Alternatively, over brightness may also occur in an image as regions in which the brightness level is higher than the optimal brightness level.

The present invention provides a post-processing method and apparatus for reducing the occurrence of uneven brightness which may be seen as shadowed regions 30 or regions 32 in which the brightness is too high within an image 10. In this particular SEM image 10 for example, the present invention increases the brightness level in shadowed regions 30, such as may be found at the edges of the interconnects 16 and the metal structure 20, where the structure height changes.

The method of the present invention may be described with reference to the flowchart of FIG. 4 in conjunction with the apparatus shown in FIG. 5. The images of a delayered IC 56 for example, may be captured by an imaging system using a particle illumination device 54 and stored in a storage memory 60, which is coupled to a data processing system 62. A brightness correction algorithm 64 is applied to the images from memory 60 by the data processing system 62 to correct any regions containing uneven brightness. The images are then stored as corrected image files in storage memory 66.

An imaging system using a particle illumination device 54 may include for example, an SEM imaging system, TEM imaging system, or a focused ion beam (FIB) imaging system. Essentially, it could include any particle based imaging system using a particle illumination process.

The data processing system 62 of the apparatus may be a personal computer (PC), a microprocessor, a digital signal processor (DSP) or any other suitable data processing system.

Figure 4:
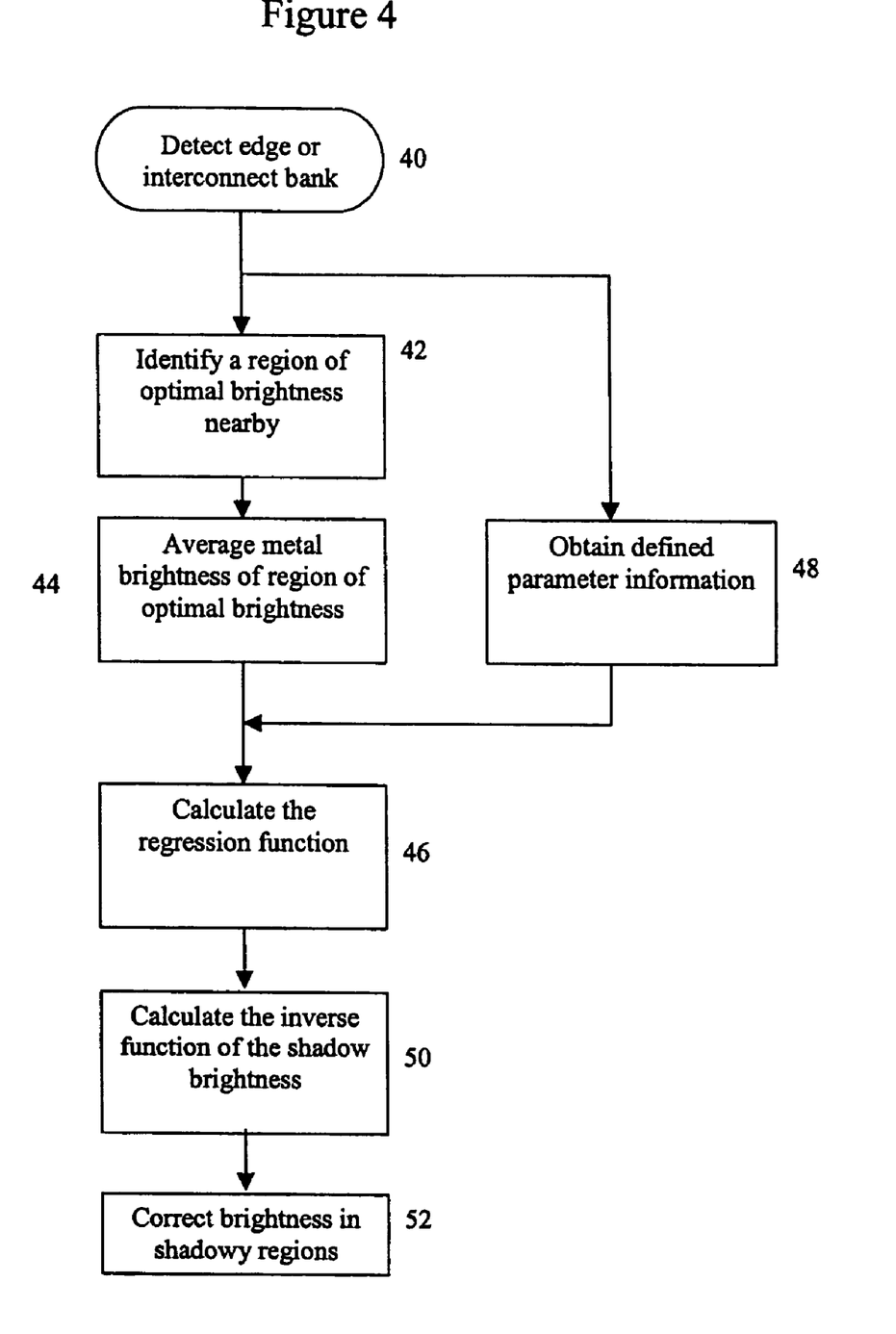
FIG. 4 is a flow chart representation of the method in accordance with the present invention.
Figure 5:
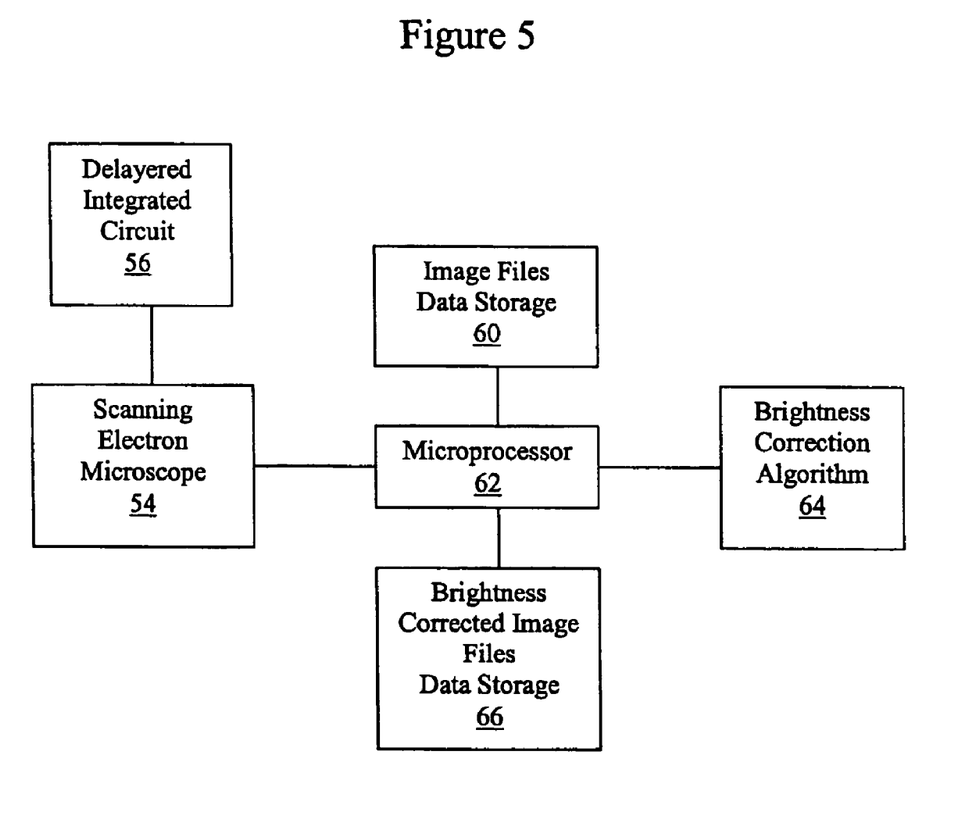
FIG. 5 is a schematic diagram of an apparatus in accordance with the present invention.

In order to correct for uneven brightness, the method includes the steps illustrated in FIG. 4. Since shadowing occurs around edges of surfaces, metal edges or interconnect banks, these are detected 40 using an edge detection algorithm. Optimal brightness is identified 42 for a region of the metal near the interconnect or edge. The average metal brightness of this region of optimal brightness is calculated 44. Defined parameters that include the number and proximity of the shadowy objects such as edges and interconnects are obtained along with information relating to the position and angle of the electron beam, the position and angle of the detector and the illumination level at the point of observation 48. Measured metal brightness is determined as a regression function 46 of the optimal brightness and the defined parameters. The inverse of the regression function is calculated 50 with respect to optimal brightness, which is used to correct the uneven brightness in the shadowy regions.

Based on the model fit above, the shadow brightness around the edges is corrected 52 by increasing the brightness of the pixels in the vicinity of the edges. Pixels that lie in regions containing multiple interconnects will have their brightness increased several times. The end result is image files with substantially corrected brightness levels and improved image quality, which are stored in storage 66.

For example, it is reasonable to suppose (as first order approximation of any model) that:

$$B_{measured}(x, y) = B_{optimal}(x, y) - \sum_{j \in Allobjects} f(\rho([x, y], Object_j)) + \xi(x, y),$$

where $B_{measured}$ is the observed brightness of an area of interest in the SEM image, $B_{optimal}$ is a point [x,y] on the metal near the shadow, where the brightness is optimal, $\rho([x,y], Object_j)$ is the shortest distance between point [x,y] and the object boundary, $\xi$ is the unknown point wise noise with zero mean; and $f$ is an unknown function that will be estimated.

The reasonable assumption for $f$ is that the further away from the interconnect, the less dramatic the decrease in brightness. In particular, for the interconnect deshadowing application, we assume that $f$ is quickly decreasing and has the form $f = \beta f^0 (\alpha \rho)$. From this equation $f^0$ is a function, which may be defined with rapidly descending values $f$, in table form, resulting from the manual analysis of a representative sample of images.

Several heuristics are used to locate points for which we know Boptimal. Once this is done, the corrected image can be derived as:

$$B_{corrected}(x, y) = B_{measured}(x, y) + \sum_{j \in AllObjects} f(\rho([x, y], \text{Object}_j))$$

From an implementation standpoint, the actual segmentation of objects is not necessary for fitting the function f. All that is needed is preliminary boundary detection. Once corrected, the region around the interconnect would appear to have the same brightness as the surrounding metal structure. This is true for both regions with shadowing and regions of over-brightness.

Figure 6:
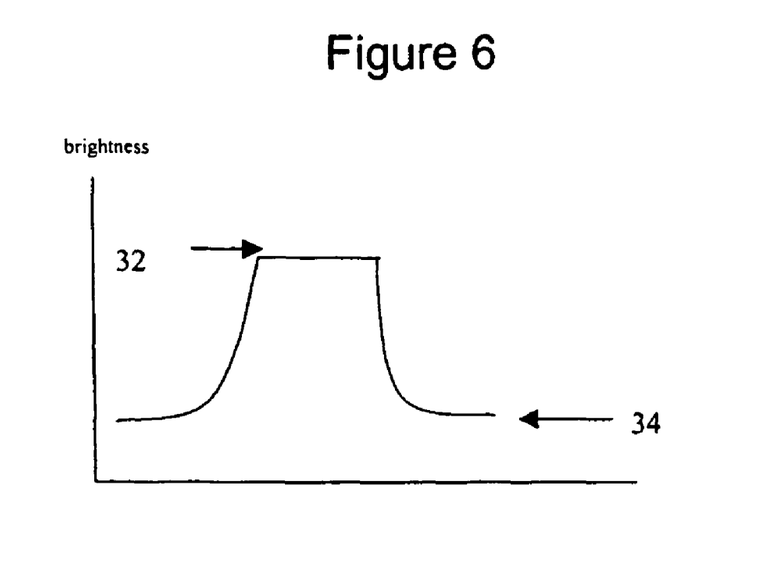
FIG. 6 is a graphical representation of the resulting brightness level across the entire area of the interconnect after post-processing using the method of the present invention.

In an ideal scenario, such as that shown in FIG. 6, the graph would not have the severe shadowing effect seen in the graph of FIG. 3. Maximum brightness 32 occurs at the highest point of the interconnect. Optimal brightness 34 corresponds to the planar metal surface surrounding the interconnect. The graph of FIG. 6 represents the optimal brightness levels achieved by the method of the present invention.

Figure 7:
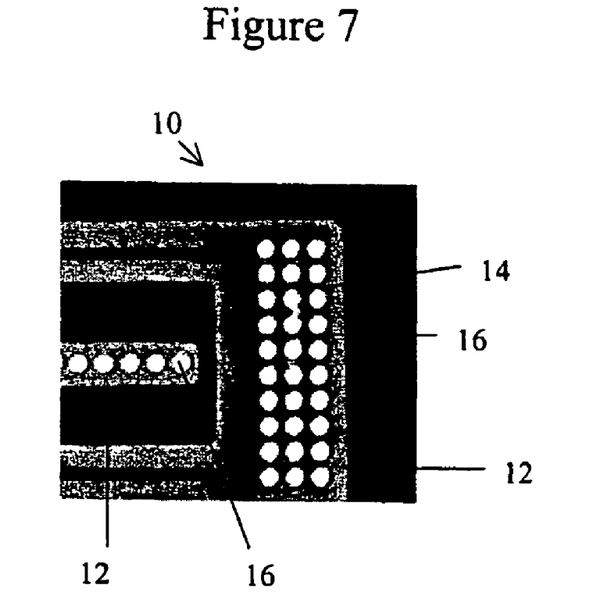
FIG. 7 is an SEM representation of a partial delayered IC showing banks of interconnects after processing using the method of the present invention.

FIG. 7 is a representation of an SEM image of the IC 10 with a number of interconnect bank structures 12 after post processing, using the method of the present invention. The shadowing effect 14 around the individual interconnects 16 and at the edges of the bank structures 12 are significantly reduced. The corrected brightness represents a significant improvement in overall image quality.

While this invention has been described with reference to a use in a SEM imaging application, it should not be deemed to be limited to this one imaging technology. In fact, this technique may be used in other imaging technologies including TEM, FIB, or in other particle illumination based imaging systems. Further, the invention should not be deemed to be limited to a method to correct the brightness in regions of shadow. The present invention may also be used to correct the brightness in regions where the brightness level is too high.

The present invention has many advantages. Brightness correction is provided without requiring a comparison of repetitive patterns within a single image and without requiring a comparison of multiple images or the use of smoothing techniques that blur the image. Further the present invention provides brightness correction which corrects the brightness levels only within specific regions of an image where shadowing or over brightness occurs.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A method for correcting uneven brightness in an image stored in a storage memory, using a data processing system having access to said storage memory, comprising the steps of:
    (a) identifying a first structure on the image having a region with uneven brightness;
    (b) identifying a region of optimal brightness on the image;
    (c) determining the observed brightness in the region of optimal brightness from the equation:

$$B_{measured}(x, y) = B_{optimal}(x, y) - \sum_{j \in AllObjects} f(\rho([x, y], \text{Object}_j)) + \xi(x, y)$$

where $B_{measured}$ is the observed brightness at a point (x,y) within the region of optimal brightness, $B_{optimal}$ is the optimal brightness for this point, $\rho([x, y], \text{Object}_j)$ is the shortest distance between point [x,y] and the object boundary, $\xi$ is the unknown point wise noise with zero mean, and f is an unknown function that is estimated; and (d) correcting the region of uneven brightness using the equation:

$$B_{corrected}(x, y) = B_{measured}(x, y) + \sum_{j \in AllObjects} f(\rho([x, y], \text{Object}_j))$$

where $B_{corrected}$ is the corrected brightness at a given point within the region of uneven brightness, $B_{measured}$ is the measured brightness for this point, $\rho([x,y], \text{Object}_j)$ is the shortest distance between this point and the identified structure, and f is the estimated function.

2. A method as claimed in claim 1 further comprising the step of:
    (e) repeating steps (a) through (d) for all subsequently identified regions of uneven brightness on the image.

3. A method as claimed in claim 1 wherein step (a) includes detecting edges of structures or interconnects to determine regions having a shadowy effect to be corrected.

4. A method as claimed in claim 1 wherein step (a) includes detecting regions having an over-brightness effect to be corrected.

5. An apparatus for correcting uneven brightness in an image comprising:
    means for identifying structures on the image having a region with uneven brightness;
    means for identifying a region of optimal brightness on the image;
    means for determining the observed brightness in the region of optimal brightness from the equation:

$$B_{measured}(x, y) = B_{optimal}(x, y) - \sum_{j \in AllObjects} f(\rho([x, y], \text{Object}_j)) + \xi(x, y)$$

where $B_{measured}$ is the observed brightness at a point (x,y) within the region of optimal brightness, $B_{optimal}$ is the optimal brightness for this point, $\rho([x,y], \text{Object}_j)$ is the shortest distance between point [x,y] and the object boundary, $\xi$ is the unknown point wise noise with zero mean, and f is an unknown function that is estimated; and means for correcting the region of uneven brightness using the equation:

$$B_{corrected}(x, y) = B_{measured}(x, y) + \sum_{j \in AllObjects} f(\rho([x, y], \text{Object}_j))$$

where $B_{corrected}$ is the corrected brightness at a given point within the region of uneven brightness, $B_{measured}$ is the measured brightness for this point, $\rho([x,y],Object_j)$ is the shortest distance between this point and the identified structure, and f is the estimated function.

6. An apparatus as claimed in claim 5 wherein the means for identifying structures having a region with uneven brightness includes means for detecting regions having a shadowy effect and/or means for detecting regions having an over-brightness effect to be corrected.

7. A method for correcting uneven brightness in an image captured from a particle-based imaging system and stored in a storage memory, using a data processing system having access to said storage memory, comprising the steps of:

(a) identifying a structure on the image having caused a region of uneven brightness in the image;

(b) identifying a region of optimal brightness on the image near the region of uneven brightness and an optimal brightness therefor;

(c) approximating an observed brightness for points of the image within said region of optimal brightness as comprising said optimal brightness and an estimated function of a distance from said points within said region of optimal brightness to said structure; and (d) correcting the region of uneven brightness by applying said estimated function to an observed brightness for points of the image within said region of uneven brightness based on a distance thereof to said structure, wherein said observed brightness for points of the image within said region of optimal brightness is approximated from the equation:

$$B_{measured}(x, y) = B_{optimal}(x, y) - \sum_{j \in AllObjects} f(\rho([x, y], Object_j)) + \xi(x, y)$$

where $B_{measured}$ is the observed brightness at a given point within the region of optimal brightness, $B_{optimal}$ is the optimal brightness for this point, $\rho([x,y],Object_j)$ is the shortest distance between this point and the identified structure, $\xi$ is a point wise noise with zero mean, and f is the estimated function; and wherein the region of uneven brightness is corrected using the equation $$B_{corrected}(x, y) = B_{measured}(x, y) + \sum_{j \in AllObjects} f(\rho([x, y], Object_j))$$

where $B_{corrected}$ is the corrected brightness at a given point within the region of uneven brightness, $B_{measured}$ is the measured brightness for this point, $\rho([x,y],Object_j)$ is the shortest distance between this point and the identified structure, and f is the estimated function.

8. The method of claim 7, wherein said optimal brightness comprises an average optimal brightness for said region of optimal brightness.

9. The method of claim 7, further comprising repeating steps (a) through (d) for all subsequently identified regions with uneven brightness on the image.

10. The method of claim 7, wherein step (a) comprises identifying an edge of said structure using an edge detection algorithm.

11. The method of claim 7, wherein said region of uneven brightness comprises one of a region of over brightness and a shadowy region.

12. The method of claim 7, wherein the image is selected from the group consisting of an SEM image, a TEM image and an FIB image.

13. The method of claim 7, wherein the region of uneven brightness is further corrected taking into account one or more imaging system parameters selected from the group consisting of a position and angle of an imaging beam, the position and angle of an imaging detector and an illumination level at a given point of observation.

14. The method of claim 7, wherein said structure comprises one of an edge and an interconnect.

15. An apparatus for correcting uneven brightness in an image captured from a particle-based imaging system comprising:

means for identifying one or more structures on the image having caused a region with uneven brightness in the image;

means for identifying a region of optimal brightness on the image near the region of uneven brightness and an optimal brightness therefor;

means for approximating an observed brightness for points of the image within said region of optimal brightness as comprising said optimal brightness and an estimated function of a distance from said points within said region of optimal brightness to said structure; and means for correcting the region of uneven brightness by applying said estimated function to an observed brightness for points of the image within said region of uneven brightness based on a distance thereof to said structure, wherein said means for approximating said observed brightness for points of the image within said region of optimal brightness is configured to approximate said observed brightness from the equation:

$$B_{measured}(x, y) = B_{optimal}(x, y) - \sum_{j \in AllObjects} f(\rho([x, y], Object_j)) + \xi(x, y)$$

where $B_{measured}$ is the observed brightness at a given point within the region of optimal brightness, $B_{optimal}$ is the optimal brightness for this point, $\rho([x,y],Object_j)$ is the shortest distance between this point and the identified structure, $\xi$ is a point wise noise with zero mean, and f is the estimated function; and wherein said means for correcting the region of uneven brightness is configured to correct this region using the equation $$B_{corrected}(x, y) = B_{measured}(x, y) + \sum_{j \in AllObjects} f(\rho([x, y], Object_j))$$

where $B_{corrected}$ is the corrected brightness at a given point within the region of uneven brightness, $B_{measured}$ is the measured brightness for this point, $\rho([x,y],Object_j)$ is the shortest distance between this point and the identified structure, and f is the estimated function.

16. The apparatus of claim 15, said means for identifying an optimal brightness comprises means for calculating an average optimal brightness for said region of optimal brightness.

17. The apparatus of claim 15, wherein said means for identifying structures comprises means for identifying an edge of said structures.

18. The apparatus of claim 15, wherein said region of uneven brightness comprises one of a region of over-brightness and a shadowy region.

19. The apparatus of claim 15, wherein the image is selected from the group consisting of an SEM image, a TEM image and an FIB image.

20. The apparatus of claim 15, further comprising means for correcting the region of uneven brightness based on one or more imaging system parameters selected from the group consisting of a position and angle of an imaging beam, the position and angle of an imaging detector and an illumination level at a given point of observation.

21. The apparatus of claim 15, wherein said structure comprises one of an edge and an interconnect.

22. An apparatus for correcting uneven brightness in an image captured from a particle-based imaging system, comprising a storage memory for storing the captured image and a data processing system having access to said storage memory and comprising data processing means for implementing the steps of claim 7.

* * * * *